(12) United States Patent
Kim et al.

(10) Patent No.: US 8,488,084 B2
(45) Date of Patent: Jul. 16, 2013

(54) FLAT PANEL DISPLAY DEVICE AND METHOD OF FABRICATING THE SAME

(75) Inventors: Ho-Su Kim, Paju-si (KR); Tae-Joon Song, Paju-si (KR); Dhang Kwon, Paju-si (KR); Hang-Sup Cho, Paju-si (KR); Seong-Pil Cho, Paju-si (KR); Doo-Hee Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 214 days.

(21) Appl. No.: 13/099,004

(22) Filed: May 2, 2011

(65) Prior Publication Data

US 2011/0273647 A1 Nov. 10, 2011

(30) Foreign Application Priority Data

May 4, 2010 (KR) .................. 10-2010-0041748

(51) Int. Cl.
*G02F 1/1335* (2006.01)
(52) U.S. Cl.
USPC ........................................................ 349/106
(58) Field of Classification Search
None
See application file for complete search history.

(56) References Cited

U.S. PATENT DOCUMENTS

| | | | |
|---|---|---|---|
| 6,334,960 B1 | 1/2002 | Willson et al. | |
| 7,785,504 B2 * | 8/2010 | Chae et al. | 264/1.7 |
| 8,076,171 B2 * | 12/2011 | Park et al. | 438/70 |
| 2006/0066777 A1 * | 3/2006 | Kim et al. | 349/106 |
| 2006/0114377 A1 * | 6/2006 | Yen et al. | 349/106 |
| 2007/0262936 A1 * | 11/2007 | Chang et al. | 345/87 |
| 2008/0252829 A1 * | 10/2008 | Chae et al. | 349/106 |
| 2010/0173553 A1 * | 7/2010 | Tanaka et al. | 445/24 |
| 2011/0147988 A1 * | 6/2011 | Song et al. | 264/293 |
| 2011/0147990 A1 * | 6/2011 | Kim et al. | 264/293 |

FOREIGN PATENT DOCUMENTS

| | | |
|---|---|---|
| CN | 1888953 | 1/2007 |
| CN | 101055368 | 10/2007 |
| CN | 101071263 | 11/2007 |
| JP | 2007-310407 | 11/2007 |

* cited by examiner

*Primary Examiner* — Sung Pak
(74) *Attorney, Agent, or Firm* — McKenna Long & Aldridge LLP

(57) ABSTRACT

A flat panel display device includes a thin film pattern formed by an imprinting mold pressing imprinting resin on a substrate, an outer thin film pattern formed on an outer region of the substrate, adjacent to the thin film pattern, wherein the outer thin film pattern is used as a demolding seed for demolding the substrate from the imprinting mold, and the outer thin film pattern configured to limit movement of the imprinting resin.

10 Claims, 13 Drawing Sheets

FLAT PANEL DISPLAY DEVICE AND METHOD OF FABRICATING THE SAME

CROSS REFERENCE TO RELATED APPLICATION

This application claims the benefit of the Korean Patent Application No. 10-2010-0041748, filed on May 4, 2010, which is hereby incorporated by reference as if fully set forth herein.

BACKGROUND OF THE DISCLOSURE

1. Field of the Disclosure

The present invention relates to a thin pattern fabricating apparatus capable of forming a demolding seed between the imprinting mold and the substrate when demolding an imprinting mold from a substrate in a separation process, and a thin pattern fabricating method.

2. Discussion of the Related Art

Recently, a variety of flat panel display devices capable of the weight and volume of a cathode ray tube (CRT), which are disadvantages thereof, have been introduced. Such flat panel display devices include a liquid crystal display, a field emission display, a plasma display panel and an electro-luminescence (EL) display.

The flat panel display devices may be configured of a plurality of thin films formed by a mask process including a deposition (coating) process, an exposure process, a development process and an etching process. However, the mask process has a problem of high fabrication cost generated by a complex fabrication process. Because of that, studies for forming a thin film in a patterning process using an imprinting mold have been recently performed.

According to such a patterning process, imprinting resin is coated on a substrate. Next, an imprinting mold with grooves and projections contacts the imprinting resin. When the grooves and projections of the imprinting mold are reversely transferred on the imprinting resin, the reverse-transferred imprinting resin is hardened in a hardening process. As a result, a desired thin pattern is formed on the substrate.

Pressure applied when contacting the imprinting mold with the imprinting resin makes a narrow gap between the imprinting mold and the substrate. Because of that, the imprinting resin 6 spreads to the end of the substrate 4 in a capillary tube shape, as shown in FIG. 1, which results in an error of being over-spread to a side of the substrate 4. In this case, a demolding seed between the imprinting mold 2 and the substrate 4 cannot be formed properly and the demolding process between the imprinting mold 2 and the substrate cannot be performed properly.

SUMMARY OF THE DISCLOSURE

Accordingly, the present invention is directed to a flat panel display device

An object of the present invention is to provide a flat panel display device and a method of fabricating the flat panel display device, which can perform a demolding process performed between an imprinting mold and a substrate stably.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a flat panel display device includes a thin film pattern formed by an imprinting mold pressing imprinting resin on a substrate; and an outer thin film pattern formed on an outer region of the substrate, adjacent to the thin film pattern, wherein the outer thin film pattern is used as a demolding seed for demolding the substrate from the imprinting mold, and the outer thin film pattern is configured to limit movement of the imprinting resin.

In another aspect of the present invention, a method of fabricating a flat panel display includes providing a substrate comprising an outer thin film pattern formed on an outer region thereof and imprinting resin formed adjacent to the outer thin film pattern; aligning an imprinting mold on the substrate; forming a thin film pattern on the substrate by bonding the imprinting mold with the imprinting resin, and preventing the imprinting resin from moving to the outer region by using the outer thin film pattern; and demolding the imprinting mold from the substrate by using the outer thin film pattern as a demolding seed for the substrate and the imprinting mold.

According to the present invention, the outer thin film pattern formed on the outer region of the substrate limits the movement of the imprinting resin while the imprinting mold is bonded with the substrate. As a result, the imprinting resin is prevented from spreading to a side surface of the substrate and side contamination of the substrate and the imprinting mold may be prevented.

Furthermore, the outer thin film pattern is not bonded with the imprinting mold. As a result, bondage between the imprinting resin and the imprinting mold is decreased in comparison to the related art. Therefore, the outer thin film pattern according to the present invention may be used as demolding seed in the demolding process between the substrate and the imprinting mold.

Accordingly, the substrate may be stably demolded from the imprinting mold by the outer thin film pattern according to the present invention.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

As follows, an exemplary embodiment of the present invention will be described in detail in reference to the accompanying drawings.

Figure 1:
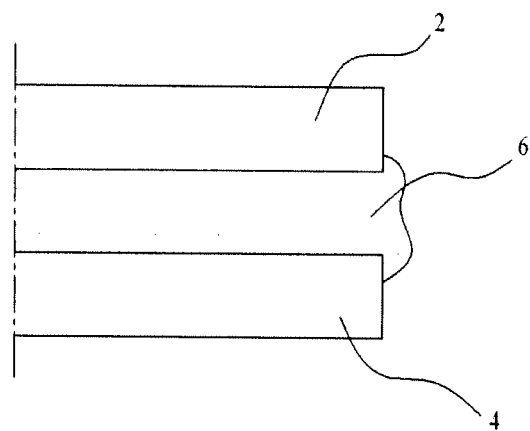
FIG. 1 is a sectional view illustrating an over-spreading of conventional imprinting resin.
Figure 2:
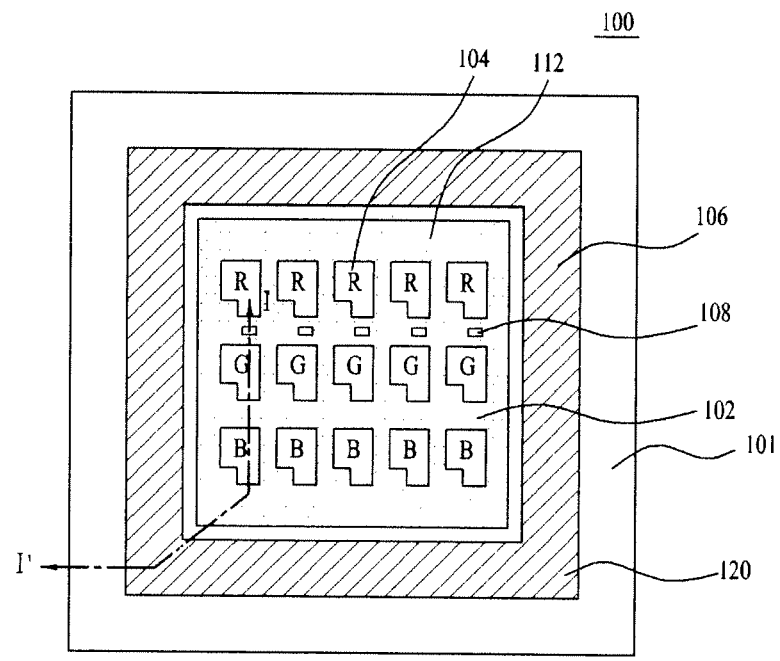
FIG. 2 is a plane view illustrating a flat panel display device according to a first embodiment of the present invention.
Figure 3:
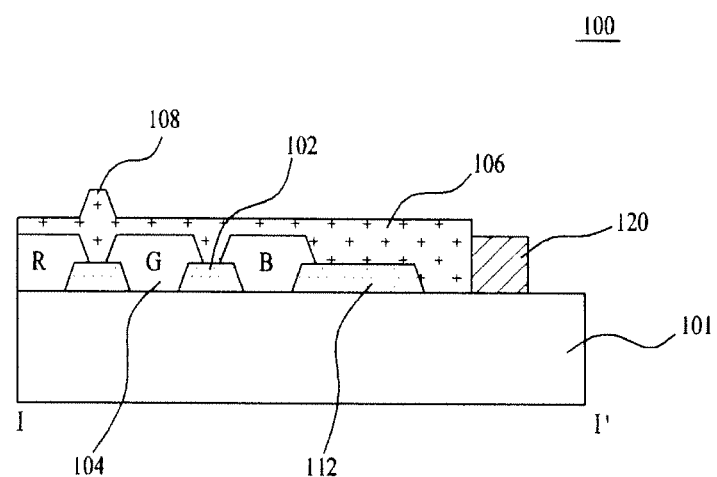
FIG. 3 is a sectional view of the flat panel display device shown in FIG. 2, cut-away along I-I' line.

FIG. 2 is a plane view illustrating a flat panel display device according to a first embodiment of the present invention. FIG. 3 is a sectional view of the flat panel display device shown in FIG. 2, cut-away along "I-I'" line.

The color filter substrate 100 shown in FIGS. 2 and 3 includes a black matrix 102 configured to prevent lights from leaking, a color filter 104 configured to present lights, an overcoat layer configured for planarization, a column spacer 108 configured to maintain a cell gap, outer thin film pattern 120 formed in an outer region of a substrate 101.

The black matrix 102 defines sub-pixel regions and is formed on the substrate 101 to prevent light interference in the sub-pixel regions. Also, an outer black matrix 112 is formed in a non-display region surrounding a display region configured of the sub-pixel regions, to prevent lights from leaking outside the substrate 101.

Red (R), green (G) and blue (B) color filters 104 are formed in the display region of the substrate 101 to present corresponding colors, respectively.

The overcoat layer 106 compensates steps of the color filter 102 and the black matrix 104. Because of that, a top surface of a color filter substrate 100 may be planarized.

The column spacer 108 is integrally formed with the overcoat layer 106, and formed of identical material. The column spacer 108 is formed to contact with a thin film transistor substrate (not shown) and it maintains a cell gap between the color filter substrate 100 and the thin film transistor substrate.

The outer thin film pattern 120 is formed to surround an edge portion of the substrate 101, to be adjacent to the outer black matrix 112 formed in the non-display region of the substrate 101.

Figure 4A:
FIGS. 4a to 4e are sectional views illustrating first to fifth embodiments of an outer thin film pattern shown in FIG. 3.
Figure 4B:
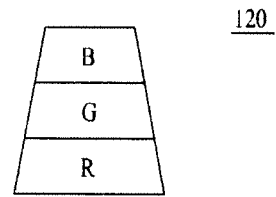
Figure 4C:
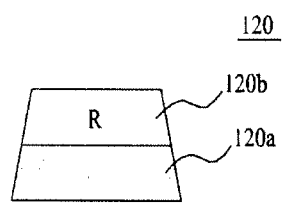
Figure 4D:
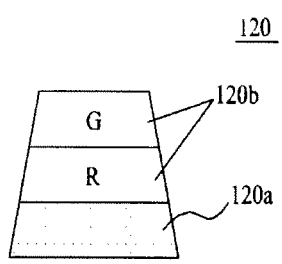
Figure 4E:
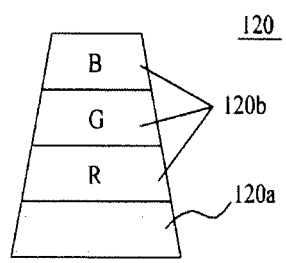

The outer thin film pattern 120 is formed of material identical to the material of the black matrix 102, with a single layer structure, as shown in FIG. 4A. Alternatively, the outer thin film pattern 120 is formed of material identical to the material of at least one of the red (R), green (G) and blue (B) color filters 104, with a single or multi-layered structure, as shown in FIG. 4B. Alternatively, the outer thin film pattern 120 includes a first outer thin film pattern 120a formed of material identical to the material of the black matrix 102 and a second outer thin film pattern 120b formed of material identical to the material of at least one of the red (R), green (G) and blue (B) color filters 104, as shown in FIGS. 4C to 4E.

Moreover, the outer thin film pattern 120 has a predetermined height identical to the height of the imprinting resin or less, before coating the imprinting resin. The black matrix 102, the color filters 104, the overcoat layer 106 and the column spacer 110, are coated with the same material. Because of that, the outer thin film pattern 120 prevents the imprinting resin from overflowing on the substrate 101 when bonding the imprinting mold with the imprinting resin.

FIGS. 5A to 5F are sectional views illustrating a method of fabricating the color filter substrate of the liquid crystal display device according to a first embodiment of the present invention. The outer thin film pattern 120 shown in FIG. 4C is applied to this embodiment.

Figure 5A:
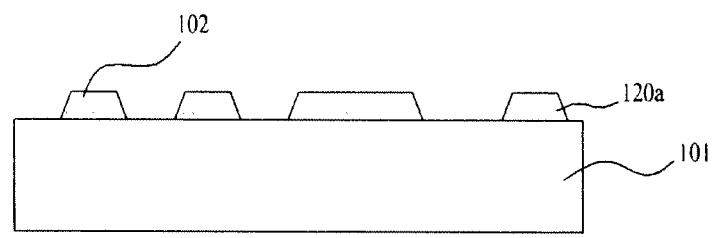
FIGS. 5A to 5F are sectional views illustrating a method of fabricating the color filter substrate of the liquid crystal display device according to a first embodiment of the present invention.

As shown in FIG. 5A, a black layer is deposited on the substrate 101. After that, the black layer is patterned in a patterning process using the imprinting mold, and then the black matrix 102 and the first outer thin film pattern 120a are formed. The first outer thin film pattern 120a is formed to surround the edge region of the substrate 101.

Figure 5B:
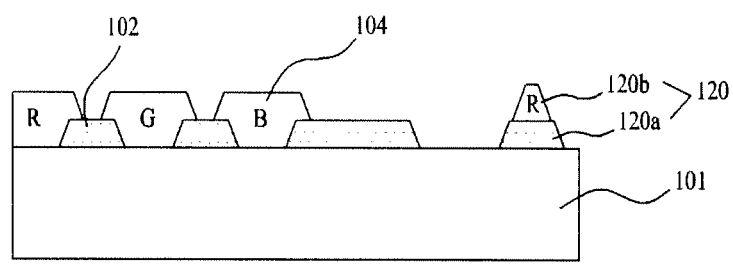

As shown in FIG. 5B, color layers are deposited on the substrate 101 having the black matrix 102 and the first outer thin film pattern 120a. After that, the color layers are patterned in a patterning process using the imprinting mold, and then the red (R), green (G) and blue (B) color filters 104 and the second outer thin film pattern 120b are formed on the substrate 101 having the black matrix 102 and the first outer thin film pattern 120a. The red (R), green (G) and blue color filters 104 are formed on a region corresponding to the sub-pixel region of the substrate 101.

The black matrix 102, the color filters 104 and the first and second outer thin film patterns 120a and 120b may be patterned and formed according to an imprinting method which uses the imprinting mold, or they may be patterned and formed in photolithography and etching processes.

Figure 5C:
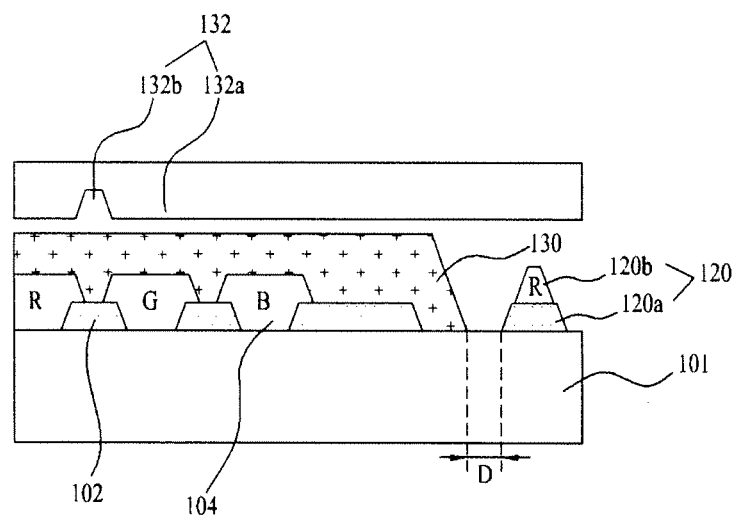

As shown in FIG. 5C, the imprinting resin 130 is coated on the substrate 101 having the black matrix 102 and the color filters 104 formed thereon. The imprinting resin 130 is coated to be spaced apart a predetermined distance (D), for example, several micrometers from the outer thin film pattern 120, considering the spreadability of the imprinting resin generated by the pressure applied when bonding the imprinting mold 132 with the substrate 101. Also, the imprinting resin 130 is coated, with a predetermined height identical to the height of the outer thin film pattern 120 or more. Because of that, deformity and poor molding of the imprinting mold generated by the outer thin film pattern 120 when bolding the mold form imprinting 132 with the substrate 101 is prevented.

Hence, the imprinting mold 132 having the groove 132b and the projection 132a is aligned on the imprinting resin 130. The projection 132a corresponds to an area where the overcoat layer will be formed and the groove 132b corresponds to an area where the column spacer will be formed.

Figure 5D:
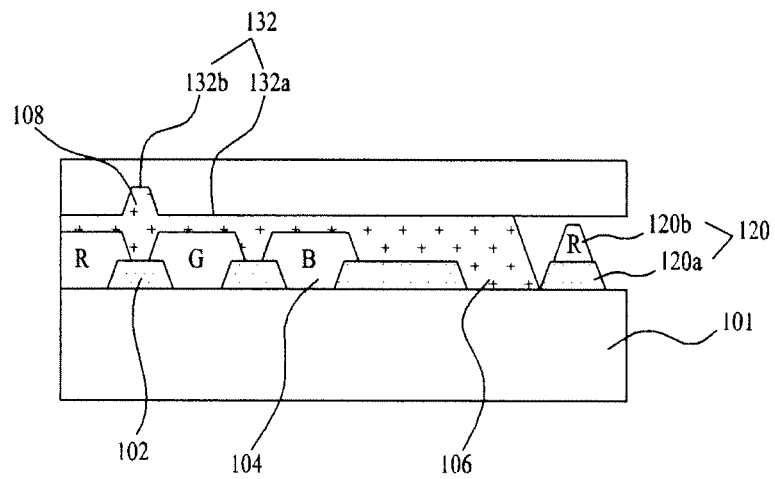

The imprinting mold 132 presses the imprinting resin 130 as shown in FIG. 5D. After that, the imprinting resin 130 moves into the grooves 132b of the imprinting mold 132. At this time, the imprinting resin 130 is prevented from spreading to the end of the substrate 101 by the outer thin film pattern 120. Because of that, the spread of the imprinting resin 130 is prevented.

The pressed imprinting resin 130 is hardened by a light such as an infrared ray or heat. After that, the column spacer 108 having a reverse-transferred appearance with respect to the grooves 132b of the imprinting mold 132 is formed and the overcoat layer 106 is formed in an area corresponding to the projection 132a of the imprinting mold 132.

Figure 5E:
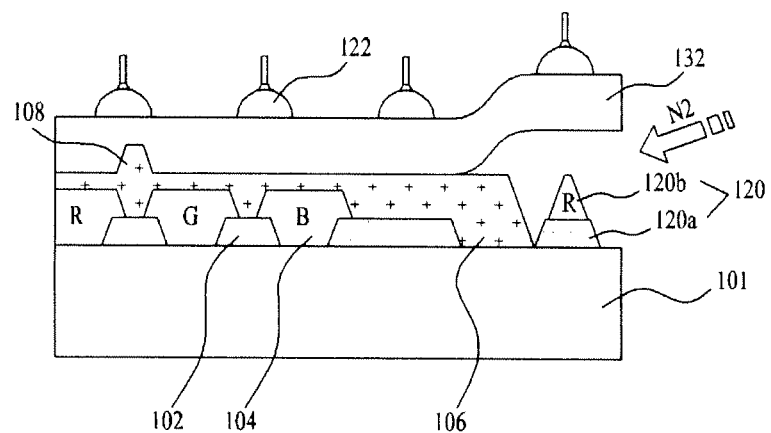

The imprinting mold 132 bonded with the substrate having the column spacer 108 and the overcoat layer 106 formed simultaneously thereon is transferred upward as shown in FIG. 5E, by a vacuum pad 122, to be demolded from the substrate 101. A predetermined gas such as $N_2$ is injected between the imprinting mold 132 and the substrate 101, such that the imprinting mold 132 may be demolded from the substrate 101 smoothly.

Figure 5F:
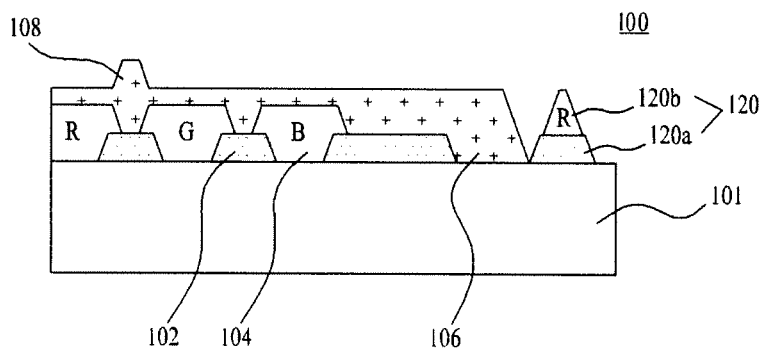

As mentioned above, the substrate 101 having the column spacer 108 and the overcoat layer 106 formed simultaneously thereon is demolded from the imprinting mold 132 and the color filter substrate 100 is completely formed as shown in FIG. 5F.

Figure 6:
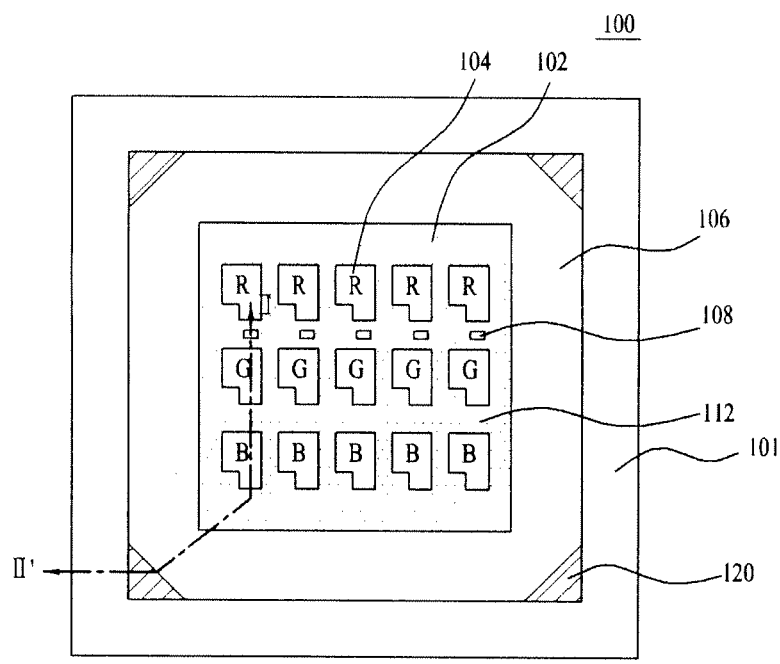
FIG. 6 is a plane view illustrating a color filter of a liquid crystal display device according to a second embodiment of the present invention.
Figure 7:
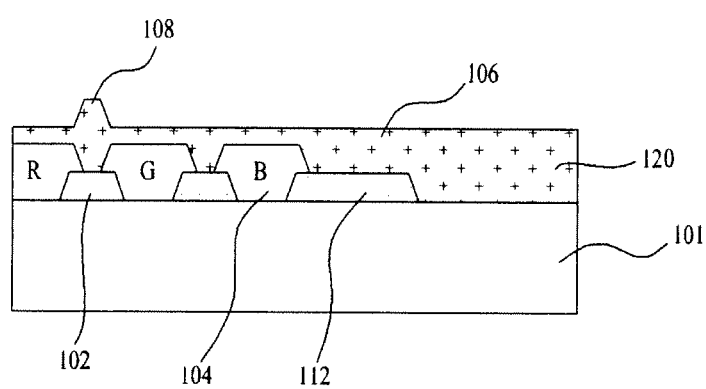
FIG. 7 is a sectional view illustrating the color filter substrate of the liquid crystal display device, cut-away along II-II' line.

FIG. 6 is a plane view illustrating a color filter of a liquid crystal display device according to a second embodiment of the present invention and FIG. 7 is a sectional view illustrating the color filter substrate of the liquid crystal display device, cut-away along II-II' line.

Compared to the color filter substrate shown in FIGS. 2 and 3, a color filter substrate shown in FIGS. 6 and 7 includes the same components except the outer thin film pattern 120 extended from the overcoat layer 106, formed of material identical to the material of the overcoat layer 106. Detailed description of the identical components will be omitted accordingly.

Figure 8:
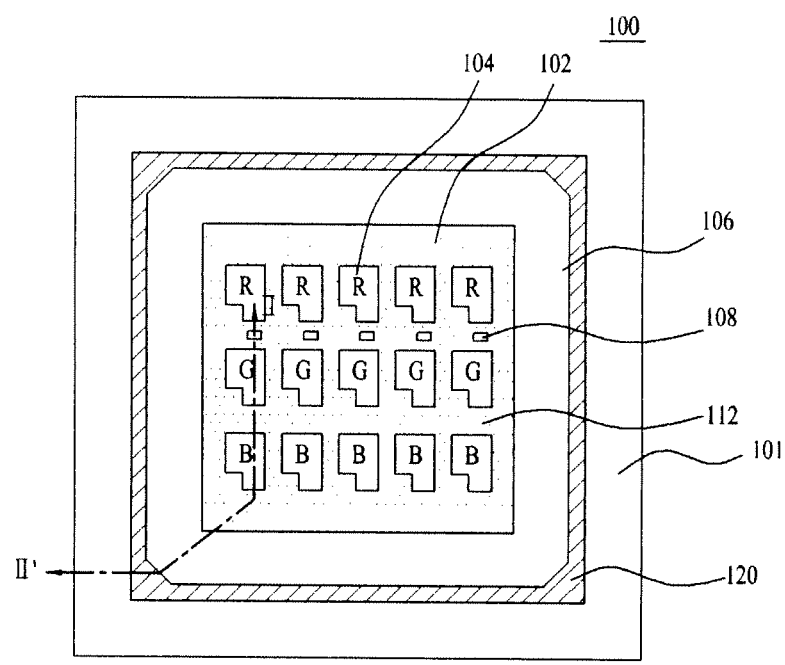
FIG. 8 is a sectional view illustrating a color filter substrate of a liquid crystal display device according to a second embodiment of the present invention.

The outer thin film pattern 120 is formed in an outer region of the substrate 101 to be distant from the outer black matrix 112 formed in the non-display region of the substrate 101. Specifically, the outer thin film pattern 120 is formed at each corner region between each edge of the substrate in a polygonal shape such as a rectangle and a triangle or in a fan shape with a curvature opposed to the outer black matrix 112. Alternatively, as shown in FIG. 8, the outer thin film pattern 120 is formed to surround the display region of the substrate 101. At this time, an intersection area of the outer thin film pattern 120 with respect to the substrate 101 is formed larger than the other area to allow the demolding process of the imprinting mold performed smoother.

FIGS. 9A to 9G are sectional views illustrating a method for fabricating the color filter substrate shown in FIG. 8.

Figure 9A:
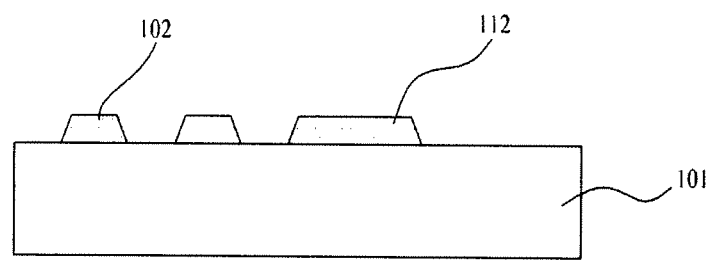
FIGS. 9A to 9G are sectional views illustrating a method of fabricating the color filter substrate shown in FIG. 8.

As shown in FIG. 9A, a black layer is deposited on the substrate 101 and then the black layer is patterned in a patterning process using the imprinting mold. After that, the black matrix 102 and the outer black matrix 112 may be formed.

Figure 9B:
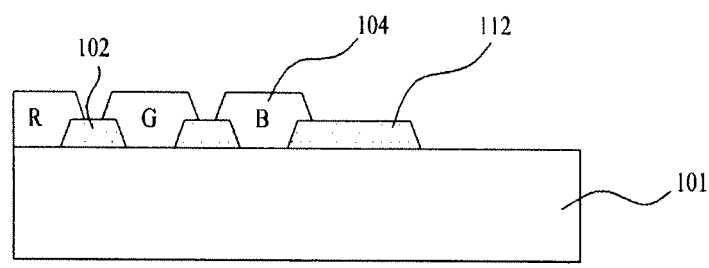

As shown in FIG. 9B, red (R), green (G) and blue (B) color filters 104 are formed in a region of the substrate 101 having the black matrix 102 formed thereon, corresponding to the sub-pixel region. Corresponding color layers are deposited and the color layers are patterned in a patterning mold using the imprinting mold, to form the red (R), green (G) and blue (B) color filters 104.

It is embodied in the present invention that the black matrix 102 and the color filters 104 are patterned and formed in an imprinting method using the imprinting mold and they may be patterned and formed in a photolithography process and an etching process.

Figure 9C:
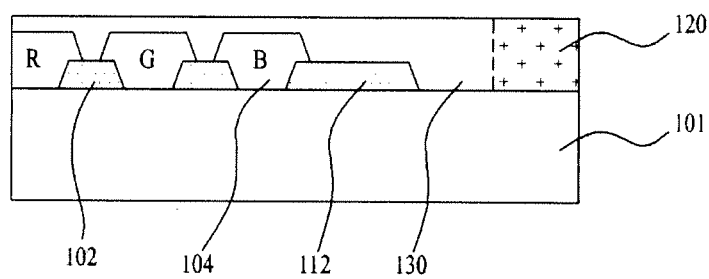
Figure 10A:
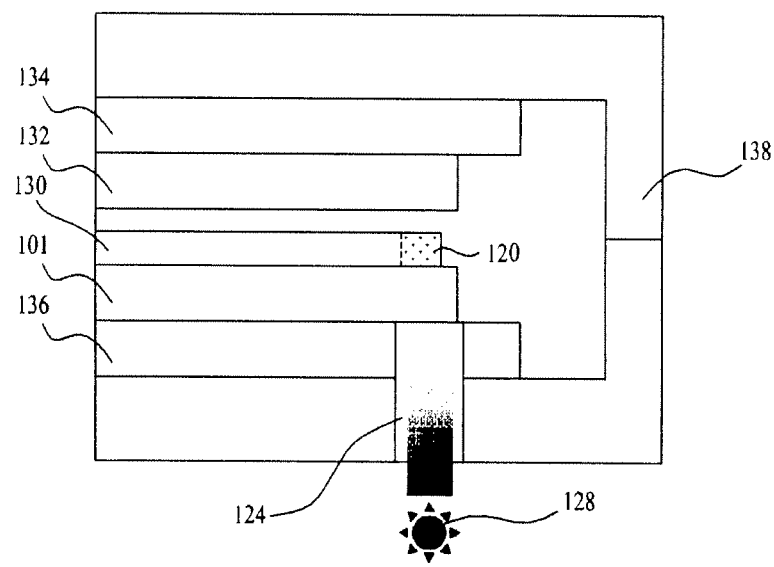
FIGS. 10A and 10B are sectional views illustrating a hardening part configured to harden imprinting resin shown in FIG. 9C.
Figure 10B:
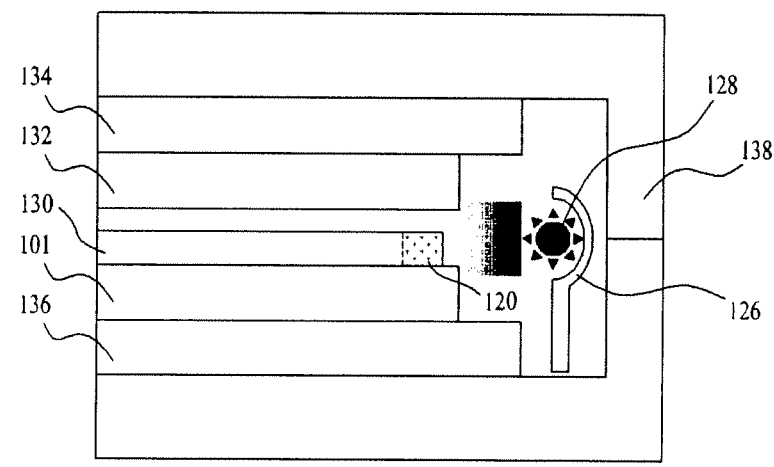

As shown in FIG. 9C, the imprinting resin 130 is coated on the substrate 101 having the black matrix 102 and the color filters 104 formed thereon. The imprinting resin 130 coated in corner regions of the substrate is hardened in advance and the outer thin film pattern 120 is then formed. Specifically, as shown in FIG. 10A, the substrate 101 loaded on a bottom stage 136 and the imprinting mold 132 loaded on a top stage 134 are located in a chamber 138. Light generated by light source 128 is incident via an open hole 124 formed through the chamber 138 and the bottom stage 136. As a result, the imprinting resin 130 formed on the substrate 101 is rear-hardened to form the outer thin film pattern 120. Alternatively, as shown in FIG. 10B, the imprinting resin 130 is side-hardened by light generated by the light source 128 formed in opposite to a side surface of the imprinting resin 130 to form the outer thin film pattern 120. At this time, a light source housing 126 formed of light reflective material is installed in the chamber 138 to prevent the light emitted from the light source 128 from being emitted toward the opposite direction of the imprinting resin 130. As a result, light efficiency is improved. Here, the imprinting mold 132 is located in the chamber 138 having the partial hardening part such as the light source 128 shown in FIGS. 10A and 10B. After hardening the imprinting resin 130, the imprinting mold 132 may be bonded with the substrate 101. Alternatively, a coating device is located in the chamber 128 having the partial hardening part such as the light source 128. After coating the imprinting resin 130 on the substrate, the imprinting resin 130 may be hardened partially. Alternatively, a coating part having the coating device located therein, a hardening part having a chamber hardening the imprinting resin partially and a bonding part having the imprinting mold 132 located therein may be aligned in a line independently.

Figure 9D:
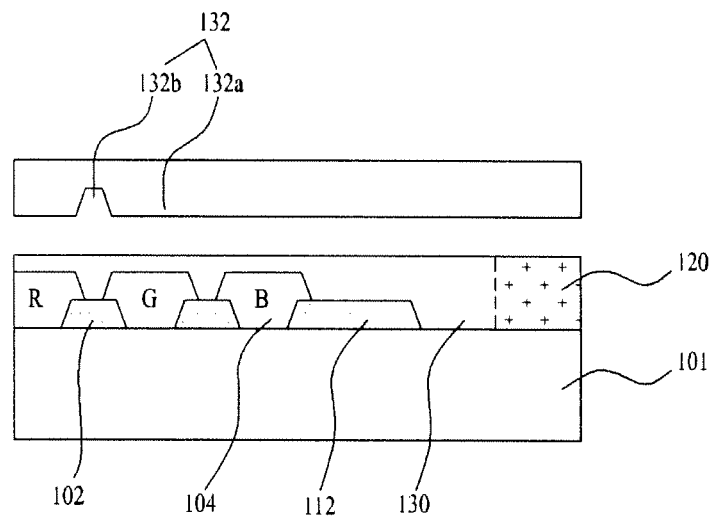

Hence, the imprinting mold 132 having the grooves 132b and the projections 132a may be aligned on the imprinting resin 130, as shown in FIG. 9D. The projection 132a corresponds to a region where the overcoat layer will be formed and the groove 132b corresponds to a region where the column spacer will be formed.

Figure 9E:
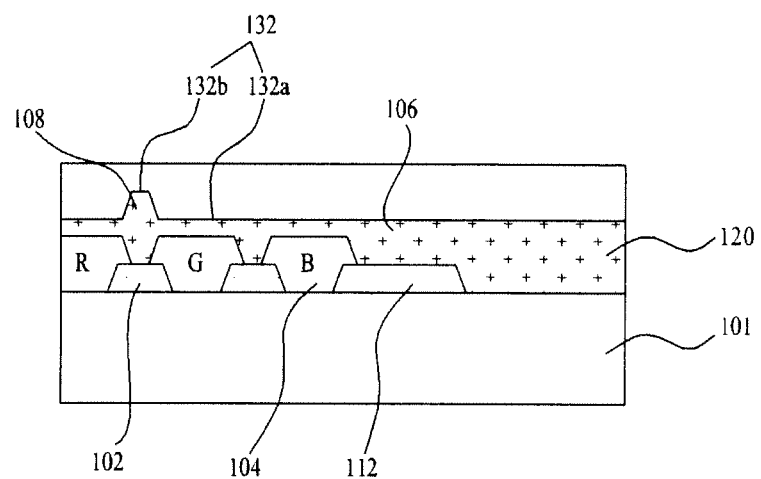

Such the imprinting mold 132 presses the imprinting resin 130 as shown in FIG. 9E. The imprinting resin 130 is moved into the grooves 132b of the imprinting mold 132. The region of the imprinting resin which contacts the imprinting mold 132 is reduced because the outer thin film pattern 120 is hardened already. Also, the imprinting resin 130 is prevented from spreading until the intersection region of the substrate 101 by the outer thin film pattern 120. As a result, over-spreading may be prevented.

The pressed imprinting resin 130 is hardened by a light such as an infrared ray or heat. As a result, the column spacer 108 having the reverse-transferred shape with respect to the groove 132b of the imprinting mold 132 and the overcoat layer 106 formed corresponding to the projection 132a of the imprinting mold 132 may be formed.

Figure 9F:
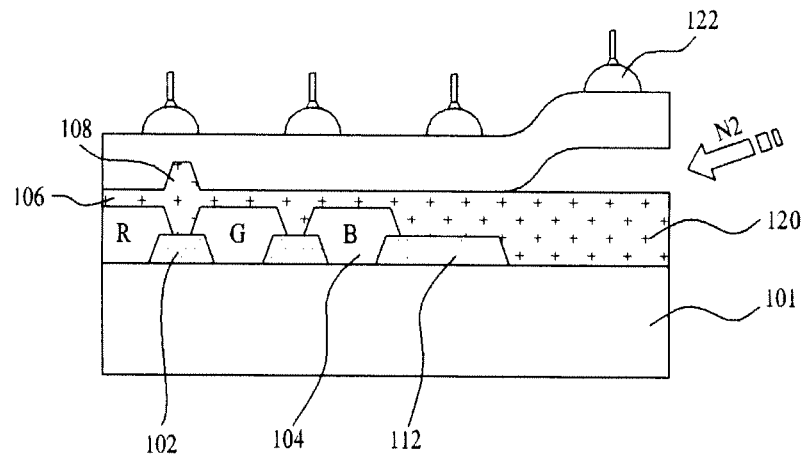

The imprinting mold 132 bonded with the substrate having the column spacer 108 and the overcoat layer 106 formed thereon simultaneously is moved in an upward direction which is opposite to the substrate 101, in a state of being fixed to the vacuum pad 122 and then it is demolded from the substrate 101 as shown in FIG. 9f. At the same time, predetermined air such as N2 is injected between the imprinting mold 132 and the substrate 101 to demold the imprinting mold from the substrate 101 smoothly. The outer thin film pattern 120 not bonded with the imprinting mold is used as a demolding seed in the demolding process performed between the imprinting mold 132 and the substrate 101. As a result, the demolding process using the vacuum pad 122 may be performed stably and the injection of gas such as $N_2$ between the imprinting mold 132 and the substrate 101 may be performed smoothly.

Figure 9G:
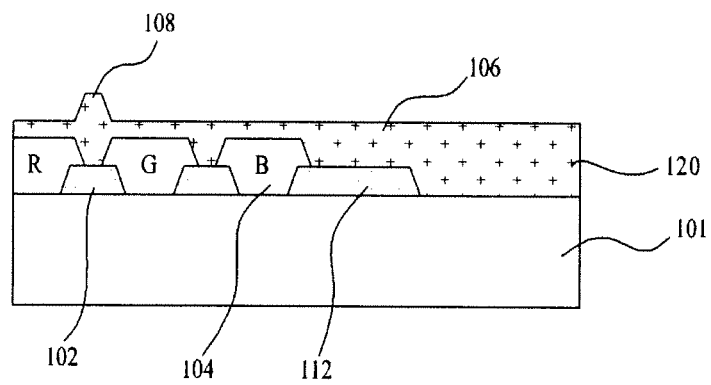

As described above, the substrate 101 having the column spacer 108 and the overcoat layer 106 formed thereon simultaneously is demolded from the imprinting mold 132, and the color filter substrate is completed as shown in FIG. 9G.

Figure 11:
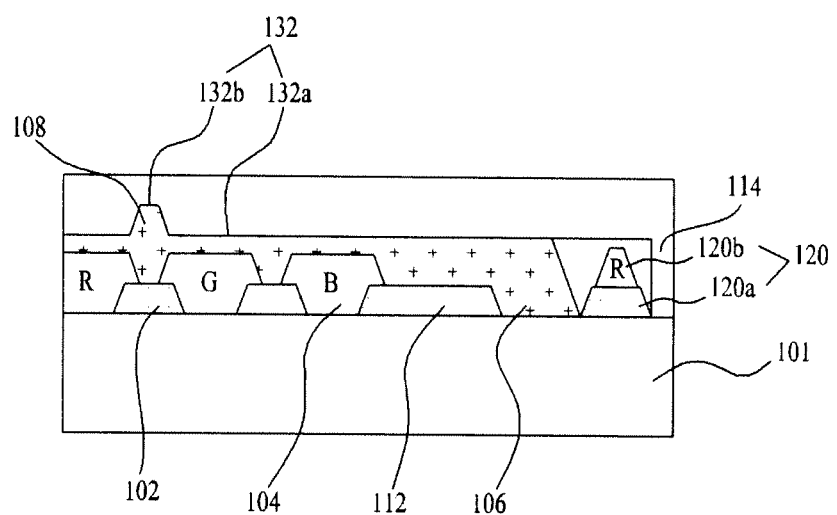
FIG. 11 is a sectional view illustrating an imprinting mold according to another embodiment, which is used in a fabricating process of the flat panel display device according to the present invention.

The imprinting mold 132 according to the present invention includes the groove and the projection used to form the thin film pattern. However, as shown in FIG. 11, outer projection 114 may be formed in a predetermined region adjacent to at least one of inner and outer regions of the outer thin film pattern 120. The outer projection 114 prevents the resin from spreading while bonding the imprinting mold 132 with the substrate and it reduces the contact area of the imprinting resin with the imprinting mold 132, to form the demolding seed smoothly.

The imprinting mold 132 according to the present invention patterns the overcoat layer 106 and the column spacer 108 simultaneously. However, rather than that, a photoresist pattern used as a mask to pattern a thin film formed of nonorganic material such as the thin film transistor, the gate line, the data line and the pixel electrode of the liquid crystal display panel may be formed in an imprinting process using the imprinting mold according to the present invention. Also, a thin film pattern formed of organic material such as color filters 104 and the black matrix 102 of the liquid crystal display panel may be formed in an imprinting process using the imprinting mold according to the present invention. Also, the outer thin film pattern 120 may be simultaneously formed with the thin film transistor, the gate line, the data line and the pixel electrode of the liquid crystal display panel, a gate dielectric layer and a protection layer.

Moreover, the outer thin film pattern 120 according to the present invention may be applicable not only to the liquid crystal display panel but also a flat panel display device including a plasma display panel, electroluminescence display and a field emission display.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A flat panel display device comprising;
    a thin film pattern formed by an imprinting mold pressing an imprinting resin on a substrate; and
    an outer thin film pattern formed on an outer region of the substrate, adjacent to the thin film pattern,
    wherein the outer thin film pattern is used as a demolding seed for demolding the substrate from the imprinting mold, and the outer thin film pattern is configured to limit movement of the imprinting resin, and
    wherein the thin film pattern is an overcoat layer of a liquid crystal display device, or the thin film pattern is formed of a predetermined material that is identical to the material of the outer thin film pattern.

2. The flat panel display device of claim 1, wherein when the thin film pattern is the overcoat layer of a liquid crystal display device,
    the outer thin film pattern is formed of a predetermined material that is identical to the material of at least one of a color filter and a black matrix provided in the liquid crystal display device below the overcoat layer, in at least one layer structure.

3. The flat panel display device of claim 1, wherein the thin film pattern is extended from the outer thin film pattern, when the thin film pattern is formed of the predetermined material that is identical to the material of the outer thin film pattern.

4. A method of fabricating a flat panel display comprising:
    providing a substrate comprising an outer thin film pattern formed on an outer region thereof and imprinting resin formed adjacent to the outer thin film pattern;
    aligning an imprinting mold on the substrate;
    forming a thin film pattern on the substrate by bonding the imprinting mold with the imprinting resin, and preventing the imprinting resin from moving to the outer region by using the outer thin film pattern; and
    demolding the imprinting mold from the substrate by using the outer thin film pattern as a demolding seed for the substrate and the imprinting mold,
    wherein the thin film pattern is an overcoat layer of a liquid crystal display device, or the thin film pattern is formed of a predetermined material that is identical to the material of the outer thin film pattern.

5. The method of fabricating the flat panel display device of claim 4, wherein providing the substrate comprises,
    forming the outer thin film pattern at an outer region of the substrate; and
    coating the imprinting resin, which is spaced apart several micrometers (μm) from the outer thin film pattern.

6. The method of fabricating the flat panel display device of claim 5, wherein when the thin film pattern is an overcoat layer of a liquid crystal display device,
    the outer thin film pattern is formed of a predetermined material that is identical to the material of at least one of a color filter and a black matrix provided in the liquid crystal display device below the overcoat layer, in at least one layer structure.

7. The method of fabricating the flat panel display device of claim 4, wherein providing the substrate comprises,
    coating imprinting resin on the substrate;
    forming the outer thin film pattern by partially hardening the imprinting resin located on an outer region of the substrate, and
    forming of the thin film pattern formed of a predetermined material that is identical to the material of the outer thin film pattern on the substrate comprises:
    hardening the imprinting resin coated on the other region except on a predetermined region where the outer thin film pattern is formed.

8. The method of fabricating the flat panel display device of claim 7, wherein forming the outer thin film pattern comprises,
    providing a chamber comprising a stage loaded with the substrate having the imprinting resin coated thereon; and
    rear-hardening the imprinting resin formed in a region corresponding with the outer region of the substrate by using an open hole formed in the stage and the chamber located in a rear surface of the substrate.

9. The method of fabricating the flat panel display device of claim 7, wherein forming the outer thin film pattern comprises,
    providing a chamber comprising a stage loaded with the substrate having the imprinting resin coated thereon; and
    side-hardening the imprinting resin by using a light source formed in a region located opposite to the side surface of the imprinting resin located in the outer region of the substrate.

10. The method of fabricating the flat panel display device of claim 4, wherein imprinting mold aligning on the substrate includes, aligning the imprinting mold on the substrate, wherein the imprinting mold comprises an outer projection formed adjacent to an outline of the outer thin film pattern formed on the outer region of the substrate.

* * * * *